United States Patent [19]

Kawaguchi et al.

[11] 4,446,351

[45] May 1, 1984

[54] PROCESS FOR PREPARING A PRESS DIE

[75] Inventors: Kenji Kawaguchi; Osamu Hamada; Seigo Hiramoto, all of Amagasaki; Yukio Kato; Kozo Yamada, both of Nakatsugawa, all of Japan

[73] Assignee: Mitsubishi Denki Kabushiki Kaisha, Tokyo, Japan

[21] Appl. No.: 326,163

[22] Filed: Nov. 30, 1981

[30] Foreign Application Priority Data

Feb. 27, 1981 [JP] Japan .................................. 56-28891
Apr. 7, 1981 [JP] Japan .................................. 56-52029

[51] Int. Cl.³ .......................... B23P 1/00; B21K 5/20
[52] U.S. Cl. .............................. 219/69 W; 76/107 R; 219/69 M; 219/121 PW; 219/121 PY; 219/137 WM
[58] Field of Search .......... 219/69 M, 69 W, 121 PA, 219/121 PB, 121 PK, 121 PY, 121 PW, 76.16, 137 WM; 76/4, 107 R

[56] References Cited

U.S. PATENT DOCUMENTS 3,240,914  3/1966  Hill et al. .......................... 76/107 R
4,162,389  7/1979  Shimada et al. .................. 219/121 P
4,333,000  6/1982  Shimizu ............................ 219/69 M

FOREIGN PATENT DOCUMENTS 55-16749  2/1980  Japan .......................... 219/137 WM
56-4331   1/1981  Japan .............................. 76/107 R

OTHER PUBLICATIONS

Nitriding, Sintering and Brazing by Glow Discharge" by Claud K. Jones and Stuart W. Martin, pp. 94–98, vol. 4, 1964.

Primary Examiner—B. A. Reynolds
Assistant Examiner—Alfred S. Keve
Attorney, Agent, or Firm—Oblon, Fisher, Spivak, McClelland & Maier

[57] ABSTRACT

A process for preparing a press die comprises forming a metal overlaid on a base metal which is different in kind from the overlaid metal, and cutting the base metal together with overlaid metal into a predetermined shape.

8 Claims, 7 Drawing Figures

F I G. 3
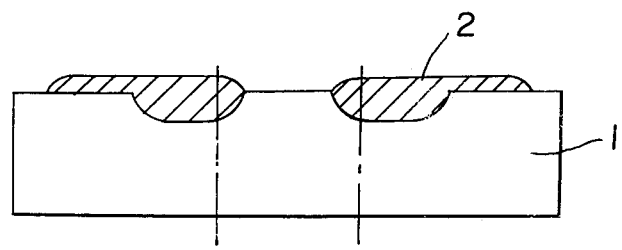
F I G. 4
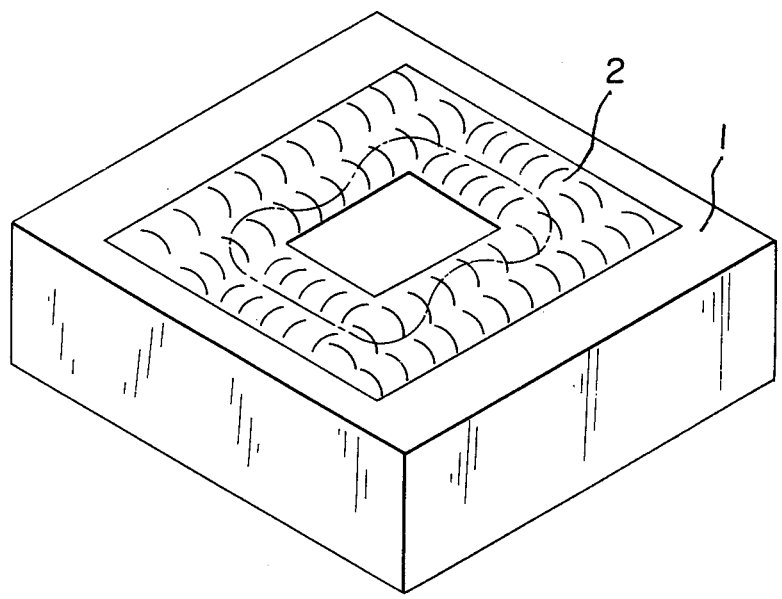

PROCESS FOR PREPARING A PRESS DIE

BACKGROUND OF THE INVENTION

1. Field of the Invention

The present invention relates to a process for preparing a die suitable for pressing sheet metal material.

2. Description of the Prior Art

Heretofore, press dies have been prepared by shaping carbon tool steel, alloy steel or die steel and heat-treating the die, or by casting cast iron or a copper-aluminum alloy. In particular, in order to prepare a large-size press die, copper-aluminum alloy having excellent properties of wear resistance, protection against galling and smoothness has been overlaid on a base metal formed by roughly machining a low cost steel, thereby obtaining an economical and excellent metal die.

When carbon tool steel, alloy steel or die steel is used, it is necessary to carry out heat treatments after a rough-machining and a relatively complicated grinding operation. In particular, it is difficult to carry out the grinding of the inner surface of a die having a complicated shape. A casting process is required for cast iron or copper-aluminum alloy. The cast iron has a disadvantage of low wear resistance and the copper-aluminum alloy has a disadvantage of high material cost even though it has excellent properties of wear resistance, protection against galling and smoothness. In the conventional process in which copper-aluminum alloy is welded on the surface of the base metal, it is necessary to roughly machine the inner surface of the die. It is difficult to form a overlaid metal on the inner surface of the die when the shape of die is complicated or the size is small.

In the case of carbon tool steel, alloy steel or die steel, when a blank of stainless steel plate or high tensile steel plate is worked, galling is easily caused in a drawing operation. When the galling occurs, the surface of the pressed product is damaged. It is thus necessary to grind the die so as to repair the galling damage.

SUMMARY OF THE INVENTION

It is an object of the present invention to provide a process for preparing a press die which has excellent mechanical properties, is economical and can be easily obtained.

It is another object of the present invention to provide a process for preparing a press die which does not require quenching and tempering operations and does not cause any galling.

The foregoing and the other objects of the present invention have been attained by providing a process for preparing a press die which comprises forming an overlaid metal on the surface of a base metal which is different in kind from the overlaid metal, the overlaid metal having excellent properties of wear resistance, protection against galling and smoothness, and cutting said base metal with said overlaid metal in one step by using a special cutting process such as wire cut electric discharge process, without requiring a finishing operation.

BRIEF DESCRIPTION OF THE DRAWINGS

FIG. 3 is a sectional view illustrating another embodiment of the present invention;

FIG. 4 is a schematic view of the die shown in FIG. 3;

DETAILED DESCRIPTION OF THE PREFERRED EMBODIMENTS

Figure 1:
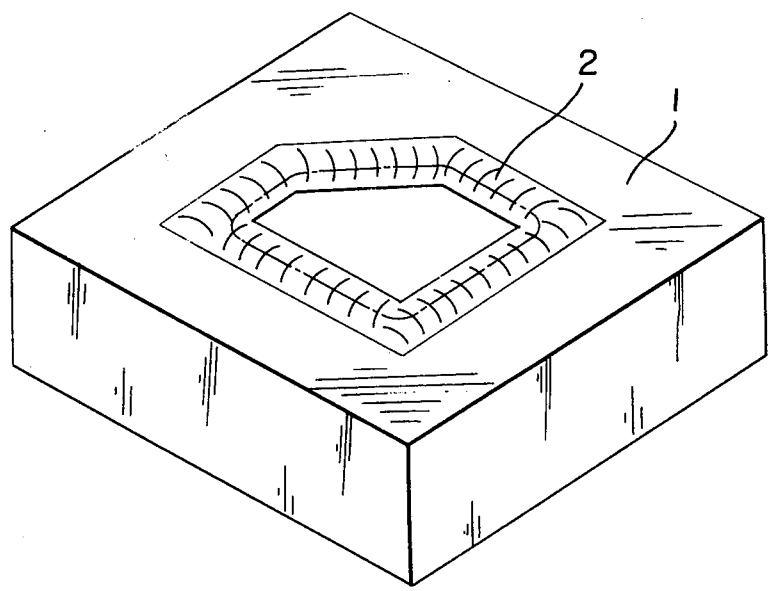
FIGS. 1 and 2 are schematic views illustrating a first embodiment of the process of preparing a press die according to the present invention.

Several embodiments of the present invention will be described with reference to the drawings in which the same reference numerals designate the same or corresponding parts throughout the views.

In FIG. 1, the reference numeral 1 designates a base metal made of an inexpensive stiff material, such as rolled steel for general use or carbon steel for machine structural use, and 2 designates a metal such as copper-aluminum alloy having excellent properties of wear resistance, protection against galling and smoothness, overlaid metal 2 being formed by overlaying on base metal 1.

Figure 2:
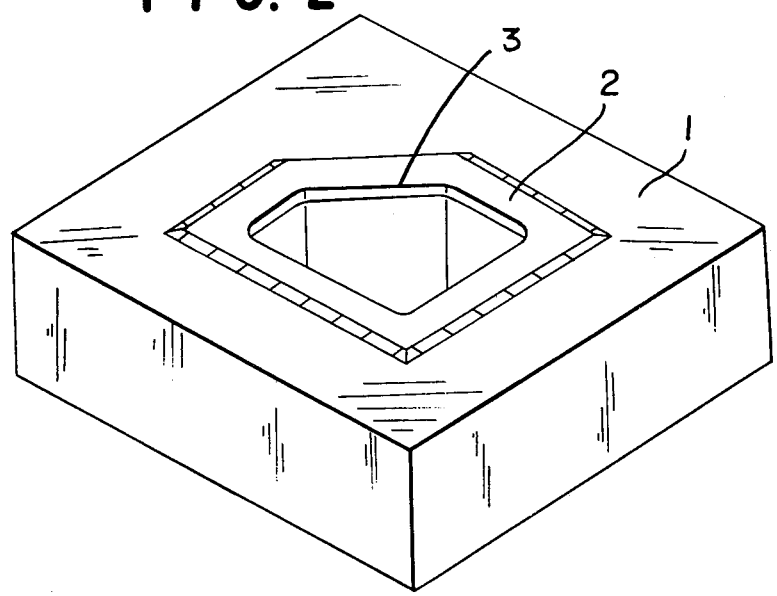

In the preparation of the press die, a metal substrate is roughly machined into a predetermined shape to form the base metal 1 as shown in FIG. 1 and the metal 2 is overlaid as desired on the upper surface of the base metal 1. The surface of the overlaid metal 2 and other portions of the die, if necessary, are finished, and they are cut into a predetermined shape of the die (indicated by the dotted line in FIG. 1) by, for example, a wire-cut electric discharge process which eliminates any post-machining steps to obtain a completed die shown in FIG. 2. The machining of the die-R portion 3 is needed if the die is to be used as a female die.

The die obtained by the processes described above can be used effectively as a female die or a blank holder. In the press operation, slippage of the die relative to a work piece occurs at the upper surface and the die-R portion 3 of a female die while it occurs only at the upper surface of a blank holder. These portions are very important in any die and must be made of a metal having excellent properties of wear resistance, protection against galling and smoothness.

If the dimension of the die-R exceeds the thickness of the overlaid metal formed in a single layer, or wear resistance is required for the die to a depth greater than the dimension of the die-R portion, it is necessary to form two or more layers of the overlaid metal or to first form a groove at a desired portion of the upper surface of the base metal 1 before applying a multilayer overlaying.

When the shape of a press product is complicated (dotted line in FIG. 4), thereby resulting in difficulty of automatic overlaying according to the outer configuration of the product, the overlaying in a simple form, such as a rectangular or a circular shape, as shown in FIG. 4, is performed before the wire cut electric discharge process is applied.

Overlaying can be by arc welding, MIG welding etc. In view of the quality of the overlaid metal, a reverse polarity soft plasma overlaying method is most preferable because the welding provides macroscopically small penetration during the welding, thus a substantially complete overlaid metal can be obtained by single layer welding. This method can, therefore, provide dies without causing poor quality in the overlaid metal, such as a low hardness, which may result from another welding method. Application of a molten-metal ejecting method can be considered, however it may provide a porous overlaid metal layer thereby resulting in a die having poor quality. The molten-metal ejecting method is undesirable for obtaining for example, a linearly overlaid portion as shown in FIG. 1, although the method is useful for forming an overlaid portion on the entire surface of the die. This is disadvantageous from the viewpoint of material saving. It is desired to use a wire cut electric discharge process to cut the die because the process provides highly accurate cutting and eliminates any post-machining as well as providing the great advantage of allowing automatic operation without an operator.

In the description of this embodiment of the present invention, copper-aluminum alloy metal is used for forming the overlaid metal. Another metal can instead be used as long as it has excellent properties of wear resistance, protection against galling and smoothness. Another cutting method which eliminates post-machining of the die, such as laser cutting or plasma cutting can be applied instead of the wire cut electric discharge process.

In accordance with the embodiment of the present invention, a metal, such as copper-aluminum alloy, having excellent properties of wear resistance, protection against galling and smoothness is overlaid on a requisite portion of the upper surface of a stiff, inexpensive base metal such as steel, and the base metal fitted with the overlaid metal is cut by using a cutting method such as a wire cut electric discharge process without requiring any subsequent machining. This process does not require any heat treatment, grinding or casting and provides easy manufacture of a press die having excellent properties of wear resistance, protection against galling and smoothness.

The second embodiment of the present invention will be described with reference to FIGS. 5 and 6.

Figure 5:
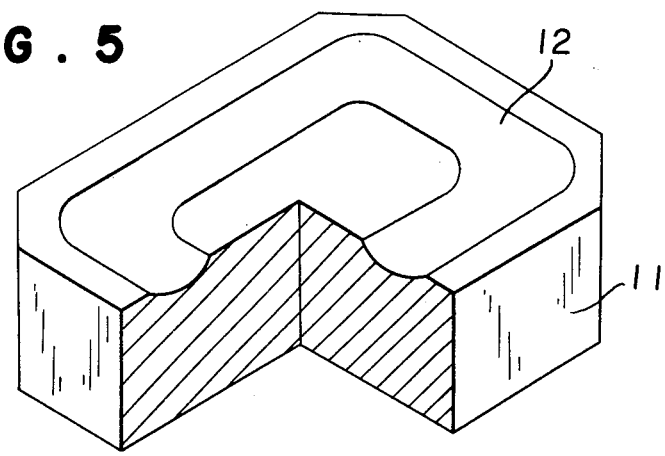
FIG. 5 is a schematic view, partially sectioned, illustrating another embodiment of the press die produced by the present invention.

FIG. 5 is a schematic view, partially cut-away of a base metal from which a drawing die also serving as a blanking punch is formed. The base metal 11 is roughly machined to a dimension slightly larger than that of the final product and the upper surface of the metal is grooved. The groove 12 is filled with an overlaying metal having excellent properties of wear resistance, protection against galling and smoothness by using a reverse polarity soft plasma overlaying method. The upper and side surfaces of the base metal 11 are then finely machined. Subsequently, the inner portion of the die is cut by the wire cut electric discharge process and the die-R portion 14 of the die is rounded to obtain the drawing die as shown in FIG. 6.

In a drawing operation, sliding contact of the die relative to a work piece occurs only at or near the die-R portion. It is therefore sufficient to provide a metal having excellent properties of wear resistance, protection against galling and smoothness only at the upper surface and the die-R portion 14 of the die.

Figure 6:
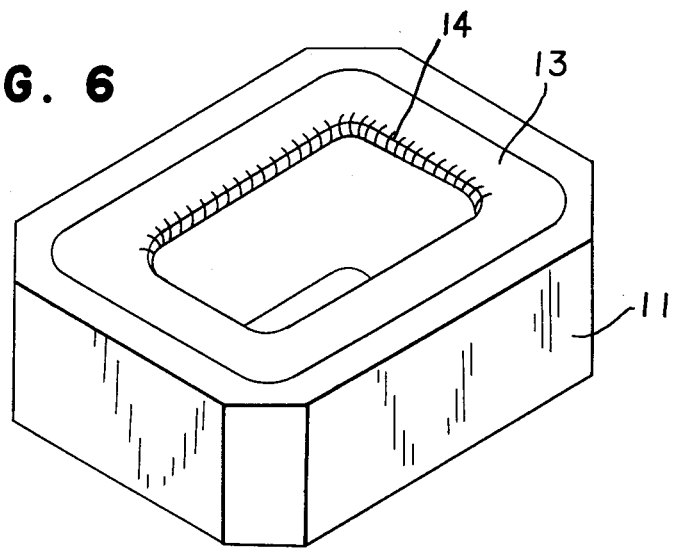
FIG. 6 is a schematic view showing the die of FIG. 5 with overlaid metal.

FIG. 6 shows a metal 13 overlaid on the groove 12 of the base metal 11 from FIG. 5. After the overlaying of the metal, the base metal is treated by ion nitriding whereby the surface of the base metal is hardened and the outer periphery may be used as a cutting edge for punching.

It is necessary for the base metal 11 to be inexpensive, stiff, free from quenching cracks due to the overlaying operation and for the die to have a sufficient hardness after ion nitriding has been applied to also act as a blanking punch. To satisfy the requirement, the base metal can be made of a carbon steel having carbon less than 0.45 wt. % or ferrite or austenite stainless steel. The overlaid metal 13 can be a copper-aluminum alloy, which has excellent properties of wear resistance, protection against galling and smoothness, has a low melting point and is compatible with high quality overlaying. Copper-aluminum alloy is one of the most desirable die materials through which stainless steel or high tensile steel, which have often caused galling of dies, is drawn; however, the copper-aluminum alloy is too fragile to use for blanking dies and is more expensive than the conventional die materials. In the present invention, copper-aluminum alloy is used so that it performs only the function of the drawing die by overlaying the alloy on the surface of the inexpensive base metal.

It is possible to provide a high quality overlaid metal on the base metal by using a reverse polarity soft plasma overlaying method. In conventional arc welding, dilution in the range of between 5% and several tens percent has been found whereby the quality of the overlaid metal has been poor and the hardness of the metal has been greatly reduced. On the other hand, the reverse polarity soft plasma overlaying method assures overlaying with dilution of about 0.1% whereby even a single layer of the overlaid metal provides a sufficient effect. When a commercially available copper-aluminum alloy having a Vickers hardness of about 400 is used as a overlaid metal and its dilution is 5%, the Vickers hardness of the overlaid metal is reduced to about 290. No reduction of hardness is found with dilution of about 0.1%. A reverse polarity soft plasma overlaying method thus quickly provides a drawing die having excellent properties.

It is necessary to harden the cutting edge portion, i.e. the outer periphery of the base metal, in order to provide the function of a blanking punch to the drawing die. In the hardening operation, conditions for the die to satisfy are: to be free from dimensional error in the completed die, to be free from changes of quality of the overlaid metal 13, and for the completed die to be sufficiently hardened even when a base metal having little hardenability is used. The ion nitriding method is the most suitable method for satisfying these conditions.

In ion nitriding, the treating temperature is relatively low, for example between five hundred and several tens of degrees (centrigrade), and masking can be applied to prevent glow discharging, thereby preventing the melting of the copper-aluminum alloy having a relatively low melting point (about 1000° C. or slightly higher) and any quality decrease due to nitriding. The ion nitriding treatment causes little deformation, thus allowing the use of the die without any further processing. The surface hardness in Vickers scale attained by the ion nitriding is in the range of between 500 and 530 with low or medium carbon steel and in the range of between 1000 to 1200 with stainless steel. Problems of wearing may arise in the cutting edge, especially the side surface of the cutting edge in the drawing die. The ion nitriding provides a hardened layer on the entire surface area. It is possible to repair the die by regrinding the upper surface, thereby allowing multiple uses. In case of stainless steel, it is possible to use the die as a drawing die for mass production of thin sheet products.

Figure 7:
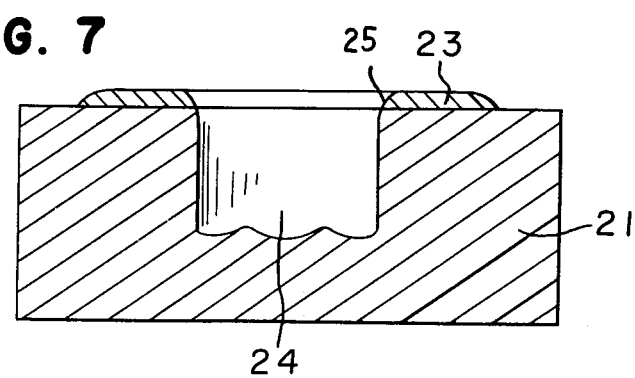
FIG. 7 is a sectional view illustrating another embodiment of the present invention.

The third embodiment of the present invention will be described with reference to FIG. 7 which is a sectional view of a drawing die having a bottom, wherein the reference numeral 21 designates a base metal, 23 designates an overlaid metal and 24 designates a die cavity.

In such a bottomed drawing die, it is not necessary to form a groove for overlaying, but the outer periphery may be cut and an oxide layer on the upper surface of the base metal 21 may be removed, if desired. Copper-aluminum alloy is overlaid on a predetermined portion of the upper surface of the base metal 21 by a reverse polarity soft plasma overlaying method. The upper surface of the overlaid metal is then finished and the die cavity is machined. Ion nitriding treatment is applied to the base metal 21 after the overlaid metal portion is masked, if desired. Slippage of the die relative to a work piece occurs at the upper surface and the die-R portion 25 of the die, and the bottom of the cavity should have a hardness sufficient to withstand strong compressive forces.

In this embodiment, the wire cutting is applied after having overlaid a metal on the die. If a die having an inner surface of a simple shape is to be prepared, the following process can be used: the base metal of the die is first gascut. The die surface is then roughly shaped and a metal is overlaid on the upper surface and near the die-R portion 25 of the die. Finally, the die is finished by machining. The process applied to the second embodiment can be combined with that of the third embodiment to obtain a bottomed drawing die serving as a blanking punch.

In accordance with the first and second embodiments, a metal having excellent properties of wear resistance, protection against galling and smoothness is overlaid by a reverse polarity soft plasma overlaying method on the surface of a base metal to provide the function of a drawing die, and ion nitriding treatment is applied to the base metal after it has been finished. The process eliminates quenching and tempering operations, allows a quick finishing operation and provides an inexpensive drawing die serving also as a blanking punch or bottomed die having high quality and being free from galling of the die.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for preparing a press die, comprising:
   forming a base metal piece having first and second surfaces;
   overlaying an overlaid metal on a selected portion of said first surface, said overlaid metal being different in kind from said base metal; and
   subsequently forming said die by cutting said base and overlaid metals into a predetermined shape in a single operation at said selected portion and by use of a wire cut electric discharging process, to form a die edge extending from said first surface towards said second surface.

2. A process according to claim 1 including the step of cutting a portion of said base metal before said overlaying step.

3. A process according to claim 1 wherein said overlaying on said base metal is performed by a reverse polarity soft plasma overlaying method.

4. A process according to claim 1 wherein said overlaid metal is a copper-aluminum alloy.

5. A process according to claim 1 wherein said overlaid metal has excellent properties of wear resistance, protection against galling and smoothness.

6. A process according to claim 1, wherein said overlaying is performed by a reverse polarity soft plasma overlaying method and including the further step of ion nitriding said base metal.

7. A process according to claim 1 wherein said base metal is made from one from the group consisting of a steel including less than 0.45 wt. % carbon, and ferrite and austenite stainless steels.

8. A process according to claim 1 wherein a single layer of overlaying metal is overlaid on said base metal.

* * * * *